United States Patent [19]

Plum

[11] 4,303,234
[45] Dec. 1, 1981

[54] DESKEWING DOCUMENT FEED TRAY

[75] Inventor: Dale Plum, Arlington Heights, Ill.

[73] Assignee: Bell & Howell Company, Chicago, Ill.

[21] Appl. No.: 93,962

[22] Filed: Nov. 14, 1979

[51] Int. Cl.$^3$ ............................................. B65H 3/06
[52] U.S. Cl. ............................ 271/109; 271/226; 271/145
[58] Field of Search ............... 271/3, 145, 161, 188, 271/226, 229, 234, 225, 109

[56] References Cited

U.S. PATENT DOCUMENTS

| | | | |
|---|---|---|---|
| 3,632,107 | 1/1972 | Rehm | 271/188 |
| 4,114,870 | 9/1978 | DiBlasio | 271/161 X |

*Primary Examiner*—Richard A. Schacher
*Attorney, Agent, or Firm*—Alan B. Samlan; J. Warren Whitesel

[57] ABSTRACT

A deskewing document transport device delivers individual documents one at a time into the nip of a pair of pickup rollers. The documents are gravity fed from an angled panel into the nip. A curved guide finger is positioned near the bottom of the angled panel and confronting one of the pickup rollers in order to form a curved gap which causes the documents to curl slightly as they approach the nip. A horizontal table is positioned under the curved gap so that, if the document is skewed, the leading edge of the curled document is lightly pressed against the table for deskewing the document as it passes through the gap. The inventive transport device is particularly well-suited for use with a microfilming camera.

9 Claims, 7 Drawing Figures

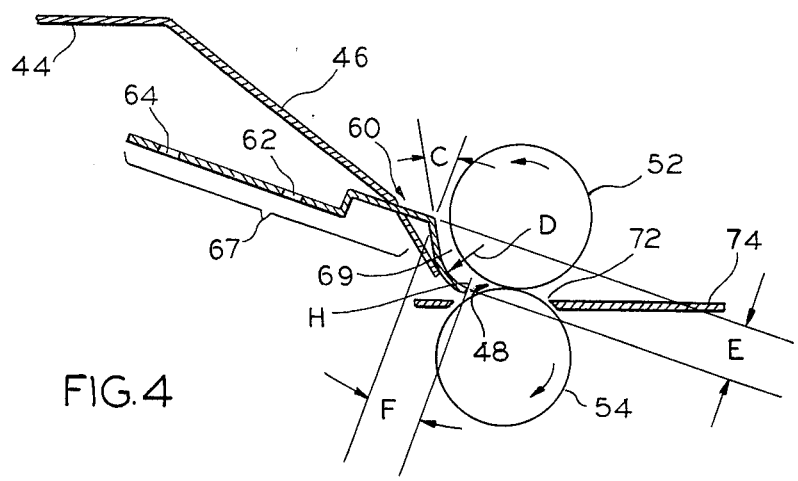
FIG. 4
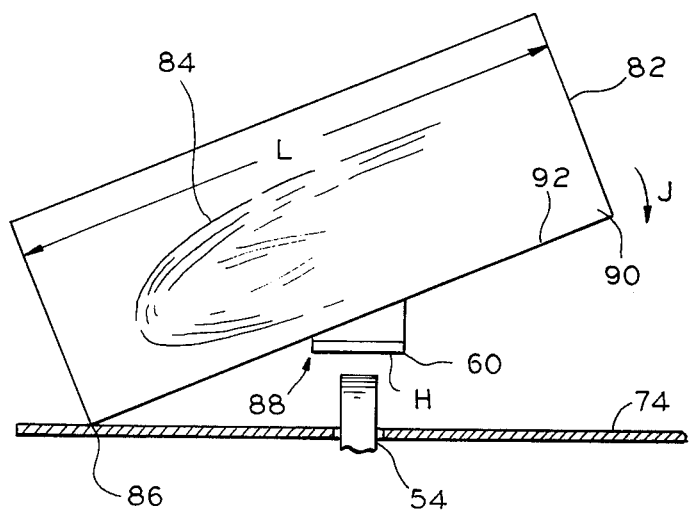
FIG. 6
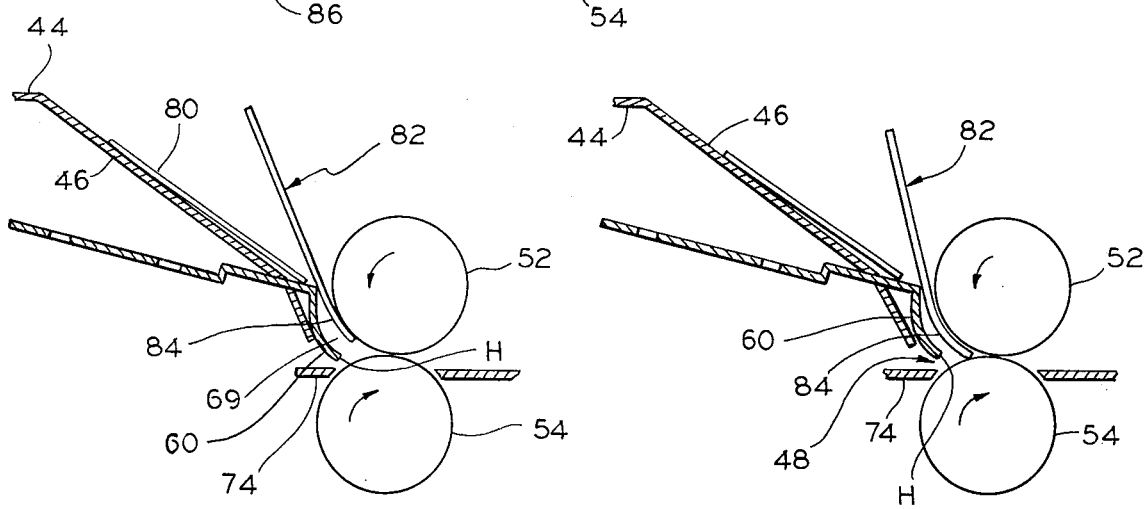
FIG. 5
FIG. 7

DESKEWING DOCUMENT FEED TRAY

This invention relates to document feed devices and, more particularly, to means for and methods of deskewing documents as they are fed through a transport and into the nip of a pair of pickup rollers.

There are many examples of times when and places where precision in single sheet document transport and paper feed is essential. For example, a paper money counting machine must not deliver two or more bills responsive to one count. Likewise, a check-microfilming machine must not fail to photograph each and every check which is presented to it. Other examples will readily occur to those who contemplate paper feed problems.

Documents should move through their transport system in such a manner that their leading edge is always oriented in a given relationship relative to the nip of pickup rollers at the end of the document travel. However, the documents sometimes become badly skewed so that they do not feed in this manner. If the misalignment is severe enough, the transport may jam completely. Or, if the transport is feeding a microfilm camera, the misalignment of the document may be so bad that a significant part of a document is outside of the format area and is not photocopied. Sometimes, one skewed document partially covers another document so that parts of both are photographed simultaneously, thereby obscuring part of the covered document.

Thus, there is a clear and pressing need for a document transport which is able to find and align all skewed documents as they move through a transport.

Accordingly, an object of this invention is to provide new and improved means for straightening documents at one end of a document transport or feed device. Here, an object is to provide a simple device for automatically aligning documents before presenting them to the nip of opposed pickup rollers.

Another object of the invention is to provide new and improved means for feeding documents to a microfilm camera. A further object of the invention is to insure an alignment of documents in the format area of a microfilm camera. Still another object is to feed and align documents in a compact, self-contained document transport and microfilming device—and especially a device for photographing cancelled checks.

In keeping with an aspect of the invention, these and other objects are accomplished by providing a document feed tray having an inclined plane which enables a gravity feed as documents slide down the plane and toward the nip of a pair of pickup rollers. At the bottom of the inclined plane, there is a small guide finger which is curved in the vertical dimension end and is opposed to one of the pickup rollers in order to form a curved document-guiding gap. As it passes through the gap, the document tends to curl with a minimum curvature of the gap and adopt a contour which is curved in both a horizontal and a vertical dimension. This curvature gives the paper a sufficient degree of rigidity to enable it to align itself as it falls on an underlying horizontal shelf or table. Hence, the leading edges of all documents are parallel to the surface of the table, as they enter into the nip of the pickup rollers.

A preferred embodiment of the invention is seen in the attached drawings wherein:

FIG. 4 is a schematic representation of the invention taken along the line 4—4 of FIG. 3; and FIGS. 5–7 are three stop motion views which indicate how the documents deskew themselves after passing through the document tray, over the guide finger, and into the nip of the pickup rollers.

The invention is described herein, by way of example, as being incorporated into a cancelled check microfilming machine disclosed in U.S. patent application Ser. No. 955,666, filed Oct. 27, 1978, by M. W. LaRue, Jr., entitled "Optical System for Rotary Camera" and assigned to the assignee of this invention. This particular machine is adapted to simultaneously photograph both sides of cancelled checks; however, other documents may also be photographed. Therefore, the following references to "checks" are only for convenience of expression.

Figure 1:
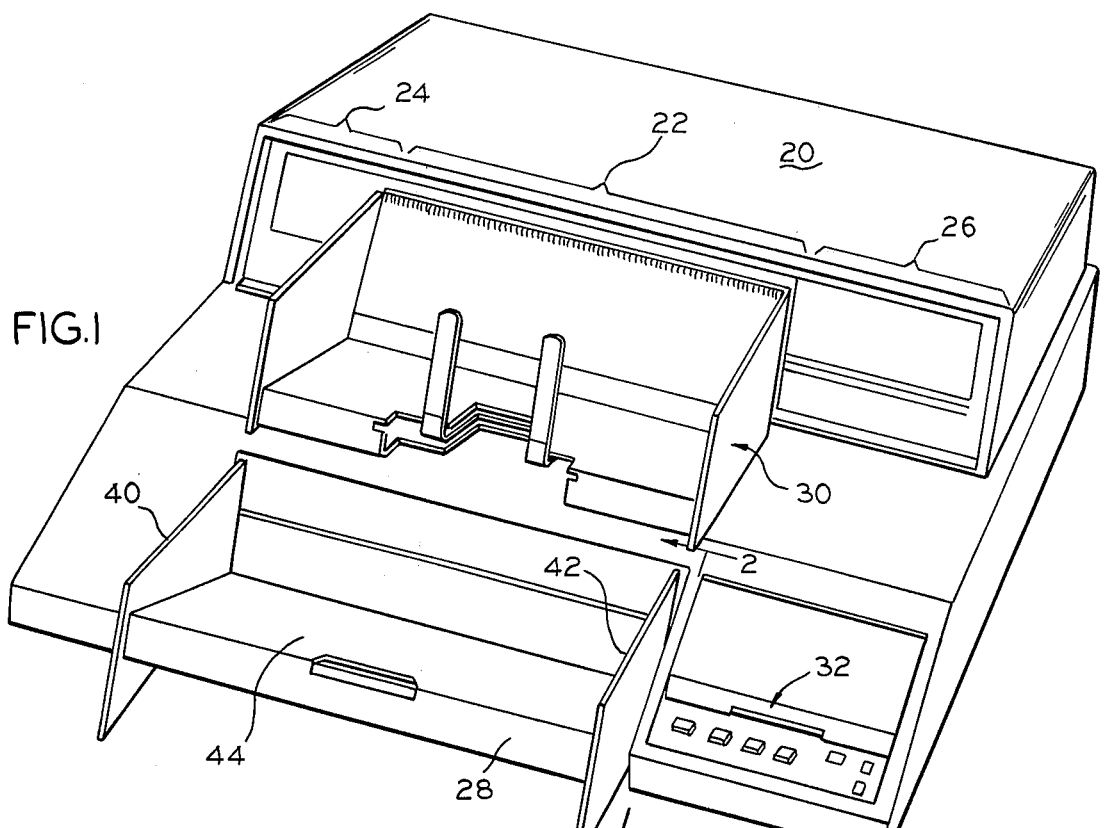
FIG. 1 is a perspective view of a compact document transport and photographing device (this particular device being for photographing cancelled checks)

The device of FIG. 1 (i.e., the Overman recorder) includes a housing 20 having a central document transport section 22, a camera section 24, and a control section 26. To operate the machine of FIG. 1, a stack of cancelled checks is placed in a document tray 28 which is constructed as a drawer that may be slid into or removed from housing 20. The cancelled checks slide down an inclined plane and pass, one at a time, into the nip of a pair of pickup rollers. The checks pass through an optical path and are deposited in an output tray 30. During the passage through the optical path, mirrors reflect images from both sides of the checks into a camera in region 24, where a microfilm record is made. The entire operation is controlled by an electronic circuit, under control of a keyboard 32.

Figure 2:
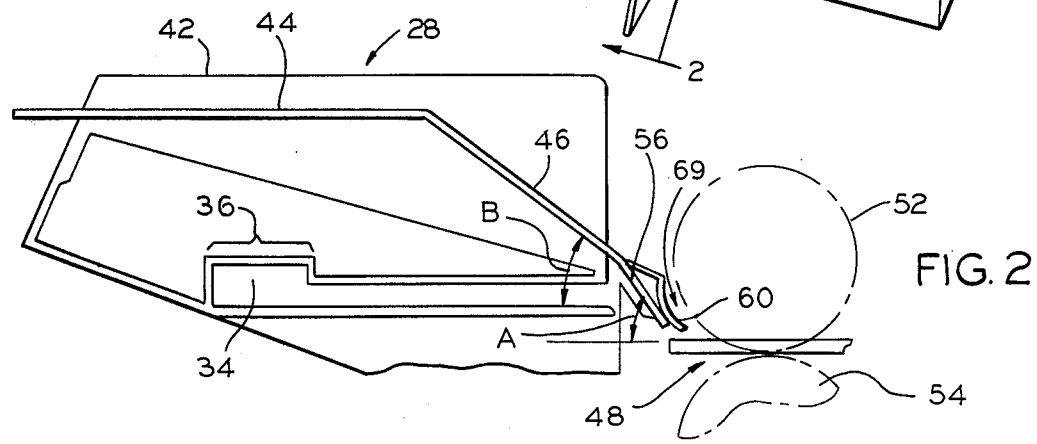
FIG. 2 is a side elevation of a document feed tray incorporating the invention.

The document tray 28 is seen in cross section (FIG. 2), taken along line 2—2 of FIG. 1. The tray 28 has a side rail 34 which is suitably supported by the housing for sliding motion. The back of rail 34 ends in a raised section 36 which drops over an abutment (not shown) in the housing in order to lock the tray in place. Thereafter, to remove the tray, the back must be lifted so that the raised section 36 is no longer captured by the abutment.

The guide tray has two spaced, parallel side walls 40,42 with a generally horizontal bottom tray panel 44 between them. The forward edge of the bottom panel 44 has a downwardly inclined angled panel 46 leading toward a nip 48 formed by pickup rollers 52,54. Leading edge 56 of panel 46 drops off more abruptly than the inclination of the plane of panel 46. In one exemplary embodiment, the angle A, between the leading edge 56 and the horizontal, is approximately 45°. The angle B, between panel 46 and the horizontal, is approximately 40°.

Figure 3:
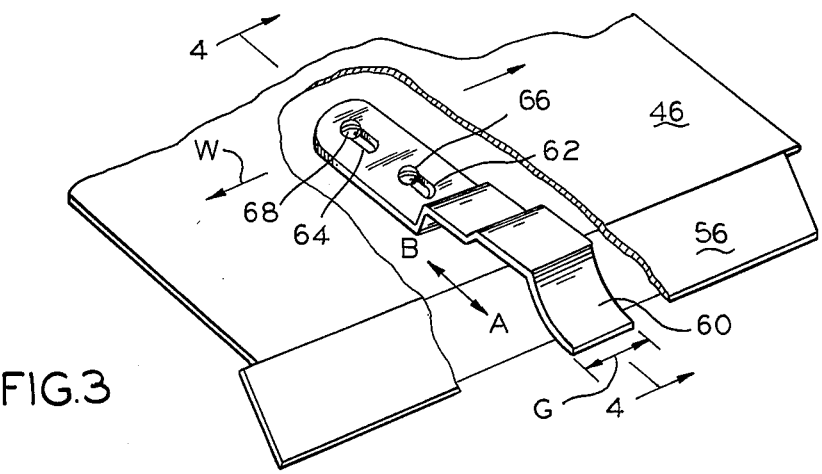
FIG. 3 is a perspective view of a fragment of the document feed tray, partially broken away to show an inventive guide finger.

The inventive guide finger 60 is best seen in FIG. 3, where the inclined guide plate 46 is partially broken away to show the details of the guide finger construction. The guide finger 60 is generally elongated and has a pair of slots 62,64 formed in one end thereof, in order to provide for a horizontal position adjustment. A pair of locking screws 66, 68 in slots 62,64 may be loosened and the guide finger may be slipped back and forth in directions A,B to provide a desired adjustment (about a quarter inch total adjustment in one embodiment) in the width of a curved feed gap 69 between the guide finger 60 and roller 52. Then, the locking screws 66,68 may be tightened once again to lock the guide finger 60 in place.

The guide finger 60 is centrally positioned relative to the width W of the tray. Therefore, documents which slide down the inclined panel 46 tend to either balance on the guide finger 60 or pivot about a fulcrum formed by the finger.

The shape and proportions of the inventive guide finger and associated gap forming parts are best seen in FIG. 4. The end contour of guide finger 60 begins with a bend at an angle C which is approximately 30° off a perpendicular taken with respect to the elongated portion 67. Then, the guide finger 60 has a more or less straight section leading into a curved lower portion having a radius of curvature D of approximately one-half to three-quarters of an inch. The total height E of the lower guide portion of finger 60 is about a half inch and the width F is about two-thirds of an inch. In the third dimension G (FIG. 3), the guide finger is about one inch wide. These guide fingers dimensions function well with checks. Guide fingers for documents having other shapes and dimensions may be designed in a similar manner.

The lowermost end H of the guide finger 60 is slightly lower than the nip 48 of the pickup rollers 52,54. Therefore, documents are directed from the end of the guide finger on to the upper rim of pickup roller 54, which urges the document into the nip 48.

The pickup rollers 52,54 are perhaps a quarter-inch thick. In FIG. 4, the roller 54 is seen projecting upwardly through a slot 72 in a horizontal table 74. Even a moment's reflection makes it apparent that the leading edge of the document is aligned by contacting the horizontal surface of table 74, at a time before it reaches the nip 48 between rollers 52,54.

The operation of the inventive delivery tray is seen in the stop motion views of FIGS. 5-7. In FIG. 5, one document 80 is seen resting on the horizontal top surface of guide finger 60 while leaning against inclined panel 46 and sliding toward the pickup rollers 52,54. The next preceding document 82 has already fallen off the horizontal top part of the inventive guide finger 60 and is passing into the curved gap 69 between the curved part of guide 60 and the pickup roller 52. The turning motion of the roller 52 tends to pull document 82 through the gap 69. At this time, the document 82 is curled around some minimum radius which is established by the curvature at the points where it makes contact with the guide finger 60 and circumference of the roller 52.

It is here assumed that the document 82 is somewhat skewed, as seen in FIG. 6 (a front view which is taken along a line perpendicular to the side view of FIG. 5). The curl in the document 82 is indicated by the shading at 84. Normally, the curl should be restricted to only a portion of the document so that it does not extend across its entire length L. As the document 82 has a "memory," it wants to return to its original flat, uncurled condition. It, therefore, provides a document-straightening force counter to the force created by roller 52 curling the document against the guide finger 60. The roller 52 provides a downward driving force against the document 82 and its associated internal uncurling force. The curl should be sufficient to create a resistance to the passage of the document through the gap 69 such that a straightening force is created, sufficient to pivot the document as described below.

The lowermost corner 86 of the skewed document 82 is shown in FIG. 6 where it strikes table 74. The driving force of roller 52 causes the document to pivot around a fulcrum point 88 provided by the guide finger 60. This pivoting action causes the document corner 90 to swing in direction J until the leading edge 92 of document 82 comes to a position in which the document has no more than an acceptable amount of skew relative to the direction of document travel. As this happens, the leading edge 92 comes into contact with the top of the pickup roller 54 (FIG. 7) which guides and urges it into the nip 48. The pickup rollers 52,54 then deliver the documents, one at a time, in a conventional manner.

Those who are skilled in the art will readily perceive how to modify the system. Therefore, the appended claims are to be construed to cover all equivalent structures which fall within the true scope and spirit of the invention.

I claim:

1. A deskewing document transport device comprising pickup means including at least one roller for picking up the top document from a stack of documents one at a time, means comprising an angled panel for directing said stack of documents toward said pickup means, curved guide finger means near the bottom of said angled panel, said curved guide means protruding from said angled panel towards and confronting said one roller and forming a gap which causes said documents to curl as they approach said pickup means, and horizontal table means positioned under said guide finger means for deskewing said documents as they pass through said gap.

2. The device of claim 1 and means for adjusting the width of said gap.

3. The device of claim 1 wherein said pickup means comprises said one roller and a second roller confronting said one roller, said guide finger means having a flat horizontal top followed by a section which is curved relative to said one roller to form a curved gap leading to a nip between said one roller and said second roller.

4. The device of claim 3 wherein said curved gap curls said document sufficiently to create a document-straightening force pushing against said one roller, said one roller driving a lowermost corner of a skewed document to engage said table and pivot said document, about said guide finger means, but said curved gap being not too small to prevent passage of said document through said gap.

5. The device of claim 3 wherein the point of pivoting about said guide finger means is displaced from the point of engagement between said document and said table sufficiently to prevent a curl from forming at a corner of said document which first engages said table.

6. The device of claim 1 further comprising means for photographing said documents as they pass through said transport device.

7. The device of claim 6 further comprising a unitary housing containing a microfilm camera, electronic control means, a control panel for controlling a microfilming flow of documents, a first tray including said guide finger means for receiving documents to be photographed and delivering them to said transport device, and a second tray for receiving said documents after they have been photographed.

8. A process for deskewing documents in a document transport system, said process comprising the steps of:
   a. feeding a plurality of documents under the force of gravity toward a document pickup means;
   b. curling each document slightly as it approaches said pickup means in order to give it a force element pushing a portion of the document against said pickup means;
   c. lightly pressing the lowermost corner of a skewed curled document against a stationary surface to square it against the surface, thereby reducing any skewing relative to said surface; and
   d. delivering the squared document to said pickup means.

9. The process of claim 8 and the added step of photographing said document after it is delivered from the pickup means.

* * * * *